ABSTRACT OF THE DISCLOSURE

Organic disulfides, and particularly dialkyl disulfides, are converted to the corresponding alcohols by treating a disulfide with an alkali metal or alkaline earth metal hydroxide in the presence of a solvent comprising a hydroxylamine at a temperature in the range of from about ambient to the reflux temperature of the solvent to prepare said alcohols.

---

This application is a continuation-in-part of my copending application, Ser. No. 630,547 which was filed Apr. 13, 1967, and now abandoned.

This invention relates to a process for the conversion of organic disulfides, and particularly, although not exclusively, dialkyl disulfides, to the corresponding alcohols. More specifically, the invention is concerned with a process for converting disulfides to alcohols whereby said process is effected in the presence of certain organic solvents of the type hereinafter set forth in greater detail.

With the increased use of detergents and other surface active agents, the problem of disposal of said compounds is becoming increasingly acute. For example, a major problem which is prevalent in many rivers and streams is the disposal of sewage and detergents which are discharged into said rivers and streams from sewers. Those detergents which produce stable foams in hard or soft waters may do so in such large quantities so that the foam will tend to clog various sewage treatment facilities and will often appear in sufficient concentration in those facilities in an amount sufficient to destroy the bacteria which are necessary for the biological action for proper sewage treatment. A typical detergent which will produce this result is an alkylaryl sulfonate, which, unlike the fatty acid solutions, will not precipitate after being mixed with hard water which contains calcium or magnesium ions in solution. Inasmuch as the compounds are only partly biodegradable, the detergent persists in solution and is carried through the sewage treatment plant in substantially unchanged or still-active form. Therefore, large quantities of foam are discharged from the sewage digestion plants into rivers or streams, where the continuing build-up of the detergent is marked by large masses of foam which persists on the surface of these rivers or streams. In addition, the dilute detergent solutions may often enter sub-surface water currents which feed into underground water drains where many cities draw their water supplies. Thus, the alkylaryl base detergents will find their way into the water supplies which are drawn from water taps in homes, factories, hospitals, schools, etc., often in sufficient quantities whereby the water will foam as it pours from the tap and is therefore rendered unpotable for drinking.

In order to combat this ever increasing build-up of detergents an effort has been made to provide detergents which are more readily biodegradable in nature. In this respect, it has been found that if the long-chain alkyl substituents on the aromatic nucleus is of a single straight-chain configuration, it will produce biologically soft detergents which will undergo bacterial degradation in the treatment of sewage and will not appear as a still-active detergent in the effluence of sewage treatment plants. However, if the long-chain alkyl substituents comprise a highly complex branched-chain structure, it will not be more readily bacterially digested than the aforementioned detergents which contain a relatively straight-chain structure.

It is therefore necessary to provide a source of relatively long-chain alkyl compounds which are relatively straight-chain in character and which may be condensed with the aromatic nucleus in a position as close to one end of the alkyl chain as possible. Therefore, the preferred alkylating agents comprise long-chain alkyl compounds in which the alpha-carbon atom contains a substituent which renders said alkyl compound an active alkylating agent. These substituents, which as hereinbefore set forth, are preferably substituted on the alpha-carbon atom, comprise halogens, hydroxyl radicals, etc.

It is therefore an object of this invention to provide a useful process for preparing 1-alkanols utilizing a novel solvent system.

In one aspect an embodiment of this invention resides in a process for the conversion of a dialkyl disulfide to the corresponding alcohol which comprises treating said disulfide with a molar excess of an alkali metal hydroxide or alkaline earth metal hydroxide in the presence of a hydroxylamine solvent at or near the reflux temperature of said solvent, and recovering the resultant alcohol.

A specific embodiment of this invention is found in a process for the conversion of a dialkyl disulfide which comprises treating di-n-dodecyl disulfide in an alkaline medium in the presence of a solvent comprising N-ethylethanolamine at a temperature in the range of from about ambient to about 150° C., and recovering the resultant 1-dodecanol.

Other objects and embodiments will be found in the following further detailed description of the present invention.

As hereinbefore set forth the present invention is concerned with a process for converting organic disulfides, and particularly higher molecular weight dialkyl disulfides in the corresponding alcohols, said conversion being effected in the presence of a particular type of an organic solvent whereby improved yields of the desired product are obtained under milder conditions than previously obtainable with alcoholic or aqeuous alcoholic solvents. In this respect, it has now been discovered that the aforementioned dialkyl disulfides may be converted to primary alcohols by effecting the conversion in the presence of a solvent comprising a hydroxylamine. Heretofore, the prior art has shown that alcohols may be obtained from mercaptides in trace amounts. If activated disulfides such as diaryl disu'fides and more complicated disulfides are treated with an alkali, the resultant product will be mercaptides and sulfinic acid salts. The prior art has stated that dialkyl disu'fides are very stable to alkali compounds. In particular, one reference reviewed the data on the hydrolysis of the sulfur-sulfur bond in disulfides. This reference concluded that only diaryl disulfides, disulfides with carbonyl functions, or disulfides wi:h unsaturated groups at the alpha-carbon atom are hydrolyzed. Genera'ly speaking, the reaction is not clean and hydrogen sulfide, sulfur, sulfinic acids, carbonyl compounds, carboxylic acids, and thio acids have all been observed as by-products.

In contradistinction to this, as hereinbefore set forth, it has now been discovered that by utilizing a solvent in which the reactants, both the alkali compound and the dialkyl disulfide are mutua'ly soluble at the reaction temperature, the aforementioned dialkyl disulfide can be converted to the corresponding alcohol in high yield and high conversions. It is readily apparent that many advantages will flow from the use of the particular type of solvent. For example, high molecular weight dialkyl disulfides, such as di-n-dodecyl disulfide, are insoluble at ambient temperature in solutions of alkali metal hydroxides, such as sodium hydroxide, in low molecular weight alcohols such as ethyl alcohol. However, by utilizing a hydroxylamine as the solvent or medium in which the reaction is effected, it is possible to obtain complete solution of not only the high molecular weight dialkyl disulfides and the alkali metal or alkaline earth metal hydroxides at ambient temperature, but in addition, the product, such as a high molecular weight alcohol resulting from the conversion is also mutually soluble in these solvents. Therefore, it is possible to allow for a desirable flow-type process by providing complete solution of the reactants and the products resulting at the end of the reaction. The conversion of the dialkyl disulfides to the corresponding alcohols may be effected at a lower reaction temperature, from ambient up to about the reflux temperature of the solvent, in contradistinction to the higher temperatures which are required when utilizing other types of solvents.

When utilizing these hydroxylamine solvents as the medium in which the reaction is to be effected, a complete solution of the reactants is effected at room temperature prior to the initiation of the reaction. This is in contradistinction to previous solvents which have been used in this type of reaction, said prior art solvents being alcoholic in nature. The aforementioned alcoholic solvents such as, for example, methyl alcohol, ethyl alcocol, n-propyl alcohol, isopropyl alcohol, etc., can only cause the alkali portion of the reaction mixture to enter into solution prior to the initiation of the reaction and also the product, comprising the organic alcohol, will be in solution at the end of the reaction, but not that portion of the reaction mixture comprising the dialkyl disulfide, especially the higher molecular dialkyl disulfides. Therefore, by utilizing a hydroxylamine solvent in which all reactants and products are mutually soluble, and as hereinbefore set forth, by effecting the reaction at a lower reaction temperature which is required when utilizing an alcoholic solvent, will result in less cost in the reaction in a commercial-type operation and will therefore make the process of the present invention both commercially and economically attractive to operate.

Examples of organic disulfides and particularly dialkyl disulfides which may be converted to the corresponding alcohols comprise those containing from 1 to about 20 carbon atoms or more and preferably those which are straight-chained in nature, although it is also contemplated within the scope of this invention that dialkyl disulfides which possess branched-chain configuration in one or both of the alkyl portions of the molecule, aralkyl disulfides, etc., may also be converted to the corresponding alcohols. Specific examples of these organic disulfides which may be converted to the corresponding alcohols include dimethyl disulfide, diethyl disulfide, di-n-propyl disulfide, di-n-butyl disulfide, di-n-pentyl disulfide, di-n-hexyl disulfide, di-n-heptyl disulfide, di-n-octyl disulfide, di-n-nonyl disulfide, di-n-decyl disulfide, di-n-undecyl disulfide, di-n-dodecyl disulfide, di-n-tridecyl disulfide, di-n-tetradecyl disulfide, di-n-pentadecyl disulfide, di-n-eicosyl disulfide, di-sec-octyl disulfide, di($\beta$-phenylethyl) disulfide, etc., as well as isomers thereof.

Examples of hydroxylamines which may be used as solvents for the process of the present invention comprises those containing the generic formula:

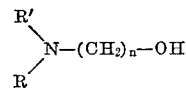

in which R and R' are independently selected from the group consisting of hydrogen, alkyl, aryl, aralkyl, alkaryl, cycloalkyl, etc., and $n$ is an integer of from 1 to about 6. Of the hydroxylamines which are hereinafter listed, the preferred solvents are those having the aforementioned formula in which at least one R is hydrogen and $n$ is preferably 2. Specific examples of these hydroxylamines which will act as solvents in the conversion of organic disulfides to the corresponding alcohols with the advantages hereinbefore set forth in greater detail include N-methylmethanolamine,
N-ethylmethanolamine,
N-propylmethanolamine,
N-isopropylmethanolamine,
N-n-butylmethanolamine,
N,N-dimethylmethanolamine,
N,N-diethylmethanolamine,
N,N-dipropylmethanolamine,
N,N-diisopropylmethanolamine,
N,N-di-n-butylmethanolamine,
N-phenylmethanolamine,
N,N-di-phenylmethanolamine,
N-benzylmethanolamine,
N,N-dibenzylmethanolamine,
N-p-tolylmethanolamine,
N,N-di-p-tolylmethanolamine,
N-cyclopentylmethanolamine,
N,N-dicyclopentylmethanolamine,
N-cyclohexylmethanolamine,
N,N-dicyclohexylmethanolamine,
N,N-dicyclohexylethanolamine,
N-methylethanolamine,
N-ethylethanolamine,
N-propylethanolamine,
N-n-butylethanolamine,
N,N-diethylethanolamine,
N,N-diisopropylethanolamine,
N-phenylethanolamine,
N-benzylethanolamine,
N-p-tolylethanolamine,
N-cyclopentylethanolamine,
N-cyclohexylethanolamine,
N-ethylpropanolamine,
N-isopropylpropanolamine,
N,N-dimethylpropanolamine,
N,N-dipropylpropanolamine,
N,N-di-n-butylpropanolamine,
N,N-diphenylpropanolamine,
N,N-dibenzylpropanolamine,
N,N-di-p-tolylpropanolamine,
N,N-dicyclopentylpropanolamine,
N,N-dicyclohexylpropanolamine, the corresponding N-mono- and N,N-di-substituted butanolamines, pentanolamines, hexanolamines, diethanolamines, etc. Of the aforementioned hydroxylamines, the preferred solvents, as hereinbefore set forth, comprise those which are preferably mono-N-substituted ethanolamines such as, for example, N-methylethanolamine, N-ethylethanolamine, N-propylethanolamine, N-n-butylethanolamine, etc. It is also within the scope of this invention to use aqueous solutions of the aforementioned hydoxylamine solvents containing up to about 50 weight percent water. However, it is to be understood that the aforementioned solvents are only representative of the type of compounds which may be used and that the present invention is not necessarily limited thereto.

The conversion of the organic disulfide, and particularly the dialkyl disulfides, to the corresponding alcohols is effected at conversion conditions which will include a temperature of from ambient up to about the reflux temperature of the particular solvent which is to be employed in the process. For example, when a solvent such as N-ethylethanolamine in which both the dialkyl disulfide and the alkali as well as the resultant alcohol are soluble, is utilized in the reaction, the conversion reaction will be effected at a temperature of about 150° C. As hereinbefore set forth, this is one of the advantages of the present process inasmuch as when utilizing an alcoholic solvent of the prior art such as a lower molecular weight alcohol, an example of which would be methyl alcohol or ethyl alcohol, the reaction had to be effected at a temperature of about 200° C. in order to recover a substantial yield of the desired alcohol. In addition, when utilizing such high temperatures it would also be necessary to utilize superatmospheric pressures. However, in contradistinction to this, the present invention may be effected at atmospheric pressure, thus enabling the reaction apparatus to be of a more simple nature without the necessity for introducing superatmospheric pressure means such as an inert gas, etc. The conversion of the dialkyl disulfide to the corresponding alcohol is also effected in an alkaline medium, said alkaline medium being accomplished by the use of an alkali metal or alkaline earth metal compound. Examples of these compounds which will afford an alkali medium will include sodium hydroxide, potassium hydroxide, lithium hydroxide, rubidium hydroxide, cesium hydroxide, magnesium hydroxide, calcium hydroxide, strontium hydroxide, barium hydroxide, beryllium hydroxide. It is also contemplated within the scope of this invention that salts such as calcium carbonate, potassium carbonate, magnesium carbonate, sodium carbonate, lithium carbonate, etc. and the alkali or alkaline earth metal alkoxides such as sodium ethoxide, etc. may also be used, although not necessarily with equivalent results.

The process of the present invention may be effected in any suitable manner and may comprise either a batch or continuous type operation. For example, when a batch type operation is used, a quantity of the organic disulfide, and particularly a dialkyl disulfide, the alkali medium effecting agent and the solvent are placed in an appropriate apparatus. One such type of apparatus which may be used comprises a sealed rotating autoclave. The autoclave is then heated to the refluxing temperature of the particular solvent which is used and maintained thereat for a predetermined residence time. This residence time may be in the range of from about 0.5 up to about 10 hours or more. At the end of this time, the autoclave and contents thereof are allowed to cool to room temperature, the solvent is separated from the reaction products by conventional means such as distillation and the alkaline bottoms are treated with a neutralizer such as a dilute acid and extracted. The solvent which is used for the extraction is then removed and the reaction product is subjected to fractional distillation to recover the desired alcohol in which the hydroxyl radical of the alcohol is on the alpha-carbon atom on the chain.

It is also contemplated within the scope of this invention that the process may be effected in a continual manner of operation. When such a type of operation is used, the reactant comprising the organic disulfide, and particularly a dialkyl disulfide, is continuously charged to a reaction zone which is maintained at the proper operating temperature. In addition, the hydroxylamine solvent is also continuously charged to the reaction zone through separate means as is the alkaline agent. It is possible, if so desired, to admix the alkaline agent and the solvent prior to introduction into the reaction zone or charge the mixture thereto in a single stream. Upon completion of the desired residence time in the reaction zone, the reactor effluent is continuously removed and the solvent separated therefrom by conventional means. The remainder is then subjected to conventional means of recovery whereby the desired organic primary alcohol is separated from the unreacted starting materials and any possible by-products which may have been formed during the reaction period. The solvent and unreacted starting materials are then recycled to the reaction zone to form a portion of the feed stock while the desired primary alcohol is recovered.

Examples of primary alcohols which may be prepared according to the process herein described include methanol, 1-ethanol, 1-propanol, 1-butanol, 1-pentanol, 1-hexanol, 1-heptanol, and especially the following, 1-octanol, 1-nonanol, 1-decanol, 1-undecanol, 1-dodecanol, 1-tridecanol, 1-tetradecanol, 1-pentadecanol, 2-octanol, 2-phenylethanol, etc.

The following examples are given to illustrate the process of the present invention which, however, are not intended to limit the generally broad scope of the present invention in strict accordance therewith.

EXAMPLE I

In this example, a mixture of 0.025 mole of di-n-dodecyl disulfide, 0.1 mole of sodium hydroxide and 75 cc. of N-ethylethanolamine, both the disulfide and the hydroxide being soluble in the hydroxylamine solvent, was placed in a round bottomed flask equipped with a reflux condenser. The solution was then heated to a temperature of about 150° C., which was the reflux temperature of the reaction mixture. The mixture was maintained at from 150° to 151° C. for a period of 3 hours. At the end of this time, heating was stopped and the reactor and contents thereof allowed to return to room temperature, following which the N-ethylethanolamine solvent was separated from the reaction product, which was also soluble in the hydroxylamine solvent, by distillation. The alkaline bottoms from the distillation were treated with dilute acid to neutralize the product and extracted with ether. The ether was removed and the residual oil was subjected to fractional distillation under reduced pressure. The desired product comprising 1-dodecanol in a 66 mole percent of the theoretical yield was recovered at 95% conversion of the di-n-dodecyl disulfide.

EXAMPLE II

In this example, 0.025 mole of di-n-tetradecyl disulfide, 0.1 mole of sodium hydroxide and 75 cc. of a solvent comprising N-propylethanolamine are placed in a flask equipped with a reflux condenser. The solution is then heated to the reflux temperature of the N-propylethanolamine solvent and maintained thereat for a period of 5 hours. At the end of this time, the contents thereof are allowed to return to room temperature and the N-propylethanolamine solvent is separated from the reaction product by means of fractional distillation. The akaline bottoms resulting from the fractional distillation are neutraized by the addition of dilute acid and extracted with ether. The ether is removed by flashing off and the residual oil is then subjected to fractional distillation under reduced pressure. The desired product comprising 1-tetradecanol is recovered from this distillation.

EXAMPLE III

A solution consisting of 0.025 mole of di-n-decyl disulfide, 0.1 mole of potassium hydroxide, and 75 cc. of a solvent comprising N-ethylpropanolamine is placed in a flask provided with a reflux condenser. It is to be noted that both the di-n-decyl disulfide and potassium hydroxide are mutually soluble in the solvent. The solution is then heated to the reflux temperature of the N-ethylpropanolamine solvent and maintained thereat for a period of 5 hours. At the end of this time, the contents of the flask are allowed to cool to room temperature. Following this, the N-ethylpropanolamine solvent is separated from the reaction product, said product being also soluble in the solvent, by means of fractional distillation. The alkaline bottoms resulting from the fractional distillation are neutralized by the addition of dilute acid and extracted with ether. The ether is then removed by flashing and the residual oil subjected to fractional distillation under reduced pressure. The desired product of the example, which comprises 1-decanol, is separated and recovered.

EXAMPLE IV

In this example, a solution which is prepared by dissolving 0.025 mole of di-n-dodecyl disulfide and 0.1 mole of sodium hydroxide in 75 cc. of N-phenylethanolamine, both the disulfide and the hydroxide being mutually soluble in the solvent, is placed in a flask provided with a reflux condenser. The solution is then heated to the reflux temperature of the N-phenylethanolamine and maintained thereat for a period of 4 hours. At the end of this time, heating is discontinued and the reactor and contents thereof are allowed to cool to room temperature. The reaction product, which is also soluble in the N-phenylethanolamine, is separated from the solvent by distillation. The alkaline bottoms resulting from the distillation are treated with a dilute acid to neutralize the product and extract it with ether. The ether is then flashed off and the residual oil is subjected to fractional distillation under reduced pressure. The desired product, comprising 1-dodecanol, is separated and recovered from this fractional distillation.

I claim as my invention:

1. A process for the conversion of a dialkyl disulfide to the corresponding alcohol which comprises treating said disulfide with a molar excess of an alkali metal hydroxide or alkaline earth metal hydroxide in the presence of a hydroxylamine solvent at or near the reflux temperature of said solvent, and recovering the resultant alcohol.

2. The process as set forth in claim 1, further characterized in that said disulfide and said hydroxide are initially dissolved in said solvent at ambient temperature and the resultant solution is thereafter heated to the reflux temperature of said solvent.

3. The process as set forth in claim 1, further characterized in that said solvent comprises N-methylethanolamine.

4. The process as set forth in claim 1, further characterized in that said solvent comprises N-ethylethanolamine.

5. The process as set forth in claim 1, further characterized in that said solvent comprises N-propylethanolamine.

6. The process as set forth in claim 1, further characterized in that said solvent comprises N-phenylethanolamine.

7. The process as set forth in claim 1, further characterized in that said solvent comprises N-ethylpropanolamine.

8. The process as set forth in claim 1, further characterized in that said dialkyl disulfide is di-n-dodecyl disulfide and said alcohol is 1-dodecanol.

9. The process as set forth in claim 1, further characterized in that said dialkyl disulfide is di-n-tetradecyl disulfide and said alcohol is 1-tetradecanol.

10. The process as set forth in claim 1, further characterized in that said dialkyl disulfide is di-n-decyl disulfide and said alcohol is 1-decanol.

References Cited

UNITED STATES PATENTS 2,837,573  6/1958  Mavity _____ 260—632
3,418,382  12/1968  Dombro _____ 260—632

OTHER REFERENCES

Reid: "Org. Chem. of Bivalents," vol. I (1958), pages 111, 112 and 128, QD412SIR4.

Reid: "Org. Chem. of Bivalents," vol. III (1960), pages 363, 372, 375 and 376, QD412SIR4.

BERNARD HELFIN, Primary Examiner

J. E. EVANS, Assistant Examiner